Aug. 1, 1967 D. R. ERRICHIELLO ETAL 3,333,911

MOUNTING STRUCTURE FOR AN ELECTRONIC DEVICE

Filed March 21, 1966 2 Sheets-Sheet 1

INVENTORS
WILLIAM SEEFELDT JR,
DOMINIC R. ERRICHIELLO
BY
Mueller, Aichele & Rauner
ATTYS.

MOUNTING STRUCTURE FOR AN ELECTRONIC DEVICE

Filed March 21, 1966

INVENTORS
WILLIAM SEEFELDT JR.
DOMINIC R. ERRICHIELLO
BY Mueller, Aichele & Rauner
ATTYS.

3,333,911

MOUNTING STRUCTURE FOR AN ELECTRONIC DEVICE

Dominic R. Errichiello, Melrose Park, and William Seefeldt, Jr., Arlington Heights, Ill., assignors to Motorola, Inc., Franklin Park, Ill., a corporation of Illinois Filed Mar. 21, 1966, Ser. No. 536,099
9 Claims. (Cl. 312—223)

This invention relates to a mounting structure for electronic equipment, and in particular to a mounting structure in which electronic equipment may be easily and quickly installed and removed.

It is often desirable to temporarily mount electronic equipment, such as a communications device, at a particular location. When the electronic equipment is no longer needed at one location, it should be easily removable so that it can be used at another desired position. By this means, costly electronic equipment can be utilized in the most efficient manner. To accomplish this, suitable mounting structures for the electronic equipment should be provided at the desired locations. The mounting structures should allow the electronic equipment to be quickly and easily installed for use at a desired location and the mounting structure should also provide for the quick removal of the electronic equipment when desired. In addition, it is desirable to protect the mounting structure during the time that the electronic equipment is not positioned therein.

An example of a system in which it is desired to mount communications equipment at various temporary locations is in public transportation such as a subway train. An electronic device containing communications equipment may be positioned in the motorman's compartment of each train for use by him during operation of the train. Since only one electronic device is needed for each train, and trains may have as many as 6 or more cars with two operating positions per car, it would be extremely costly and inefficient to provide a separate communications device at each operating compartment. Accordingly, a mounting structure is provided at each operating compartment to permit the motorman to quickly and easily install the desired communications equipment in the operating compartment from which he will control the train. In this manner, only one communications device per train would be necessary.

Each mounting structure would include an electrical connector which would mate with an electrical connector on the electronic device. The electrical connector of the unused mounting structures must be protected from damage both from natural causes and from vandalism. Since the electrical connectors may have voltages permanently present during the operation of the train, it would be necessary to cover any such connectors so that a person riding on the train cannot come in contact with such "live" connectors. Means should be provided to effectively lock the mounting structure when said structure is not in use and further to provide a lock to secure the electronic equipment within the mounting structure so that the electronic equipment cannot be removed in the absence of the operator.

Accordingly, it is an object of this invention to provide an improved mounting structure for electronic equipment wherein the electronic equipment may be easily installed and removed therefrom.

Another object of this invention is the provision of a mounting structure for electronic equipment wherein the electronic equipment may be locked within such mounting structure and wherein the mounting structure may be locked during periods of non-use.

A feature of this invention is the provision of a mounting structure for electronic equipment adapted to receive an electronic device therein. The mounting structure has an electrical connector which mates with a similar electrical connector on the electronic device to provide necessary electrical connections between the electronic device and the mounting structure.

Another feature of this invention is the provision of a mounting structure for electronic equipment including a holding plate for securing the electronic device within the mounting structure and to provide means whereby the electronic device may be locked in position.

Another feature of this invention is the provision of a mounting structure for electronic equipment wherein a cover plate is provided for protecting the electrical connector contained within the mounting structure and in which means are provided for locking the cover plate in position.

Another feature of this invention is the provision of a mounting structure for an electronic device wherein the same lock is used to secure both the cover plate and the holding plate.

The invention is illustrated in the drawing in which.

In practicing the invention, a mounting structure for an electronic device is provided which is adapted to be permanently mounted at a desired location. The mounting structure includes support means having a connector adapted to receive a similar connector on an electronic device whereby electrical connections to the electronic device can be quickly and easily established. When the electronic device is inserted within the support means, guiding means incorporated in the support means and the electronic device aid in mating the connectors. A holding plate is provided which secures the electronic device within the support means. A cover plate is also provided which is used to cover and seal the connector positioned in the support means to prevent access thereto. A single locking device is provided, in the form of a padlock, which can be used to lock both the cover plate and the holding plate.

Figures 1, 2, 7:
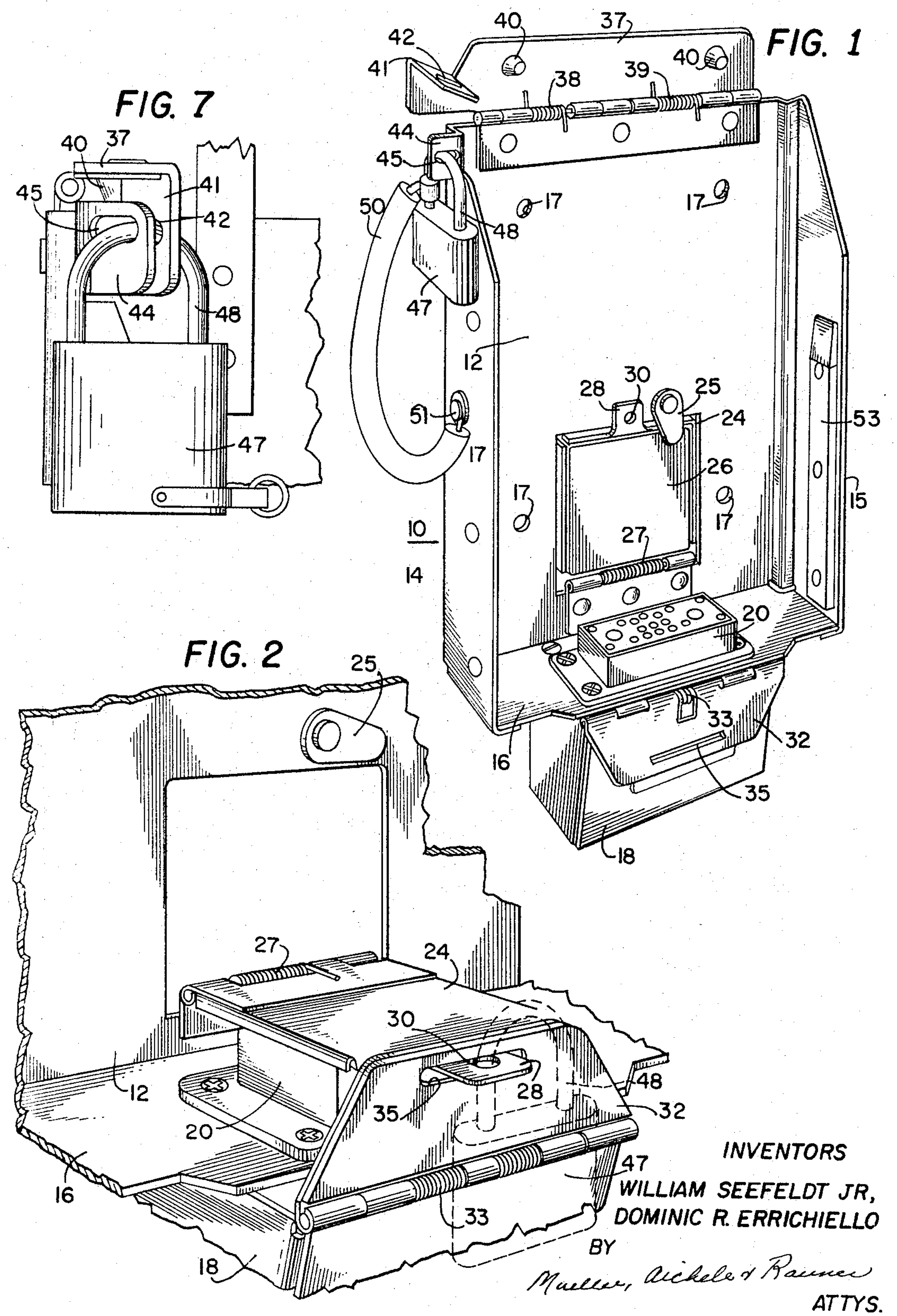
FIG. 1 is a perspective view showing the mounting structure.
FIG. 2 is a drawing of a portion of the mounting structure showing the connector and cover plate.
FIG. 7 is a drawing showing the means by which the holding plate is locked in position.

The support means 10 of the mounting structure is shown in FIG. 1 of the drawings. The mounting structure consists of a back plate 12, two side plates 14 and 15 and a bottom plate 16 joined together to form supporting means for an electronic device. A connector 20 is mounted on bottom plate 16 and positioned to mate with a similar connector mounted on the electronic device. Junction box 18 is provided to receive necessary electrical wiring through a conduit or by other means and to provide an enclosure in which electrical connections can be made to connector 20. Mounting holes 17 in the back plate 12 provide means whereby the mounting structure can be secured at a desired location.

A cover plate 24 is provided having a resilient pad 26 therein. Spring 27 urges cover plate 24 against back plate 12 where it is secured in position by latch 25. Locking plate 32 is urged downward by spring 33. Holding plate 37 is provided having springs 38 and 39 biasing holding plate 37 to an upright position. Pads 40 are provided on holding plate 37 to bear against the electronic device when it is positioned in the mounting structure. A padlock 47 is provided having a shackle 48 which is positioned in opening 45 of arm 44. Padlock 47 is secured to the mounting structure 10 by chain 50 secured to side plate 14 by fastener 51. Chain 50 is made long enough so that padlock 47 may be used to lock holding plate 37 or cover plate 24 as may be desired. FIG. 1 illustrates mounting structure 10 in condition to receive an electronic device.

Referring to FIG. 2 the position of cover plate 24, when structure 10 is not used to hold an electronic device, is shown. Cover plate 24 is positioned against the top of connector 20 and locking plate 32 is moved against the bias of spring 33 so that tongue 28 of cover plate 24 is inserted through opening 35 in locking plate 32. Opening 35 in locking plate 32 is positioned so that the top surface thereof bears against tongue 28 forcing resilient pad 26, positioned within cover plate 24, against the top of connector 20 thereby sealing the connector. Shackle 48 of padlock 47, shown dotted in FIG. 2, may be inserted through hole 30 of tongue 28 to lock the cover plate in position. In this manner, the cover plate secures connector 20 against damage.

Figure 4:
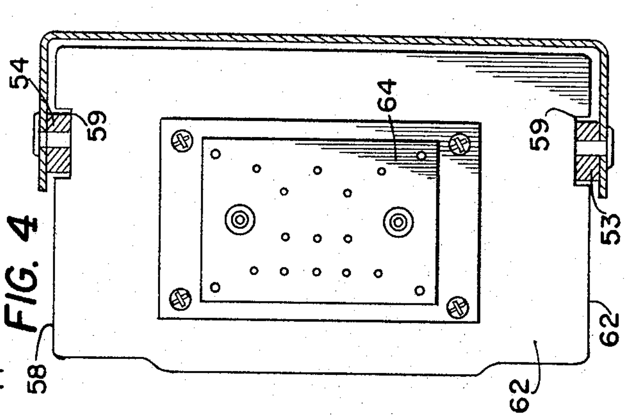
FIG. 4 is a bottom view of the electronic device showing the position of the electrical connector.
Figure 3:
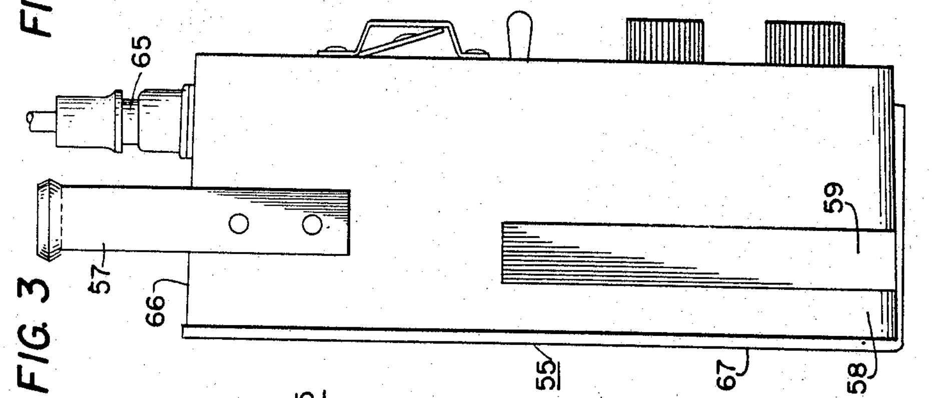
FIG. 3 is a side view of an electronic device adapted to be secured within the electronic body structure.

FIG. 3 is a side view of the electronic device 55 which is adapted to be mounted in mounting structure 10 of FIG. 1. Electronic device 55 includes a handle 57 for ease in carrying and guide slot 59 positioned on side wall 58. FIG. 4 is a bottom view of the electronic device 55 of FIG. 3 showing connector 64 positioned on the bottom end wall 62 thereof. Connector 64 is designed to mate with connector 20 of the electronic device.

Figure 6:
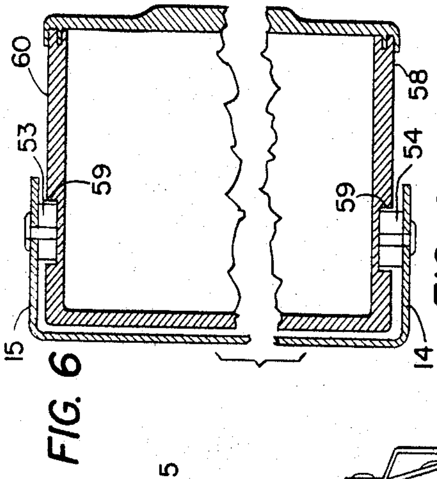
FIG. 6 is a sectional view showing the guides for positioning the electronic device within the mounting structure.
Figure 5:
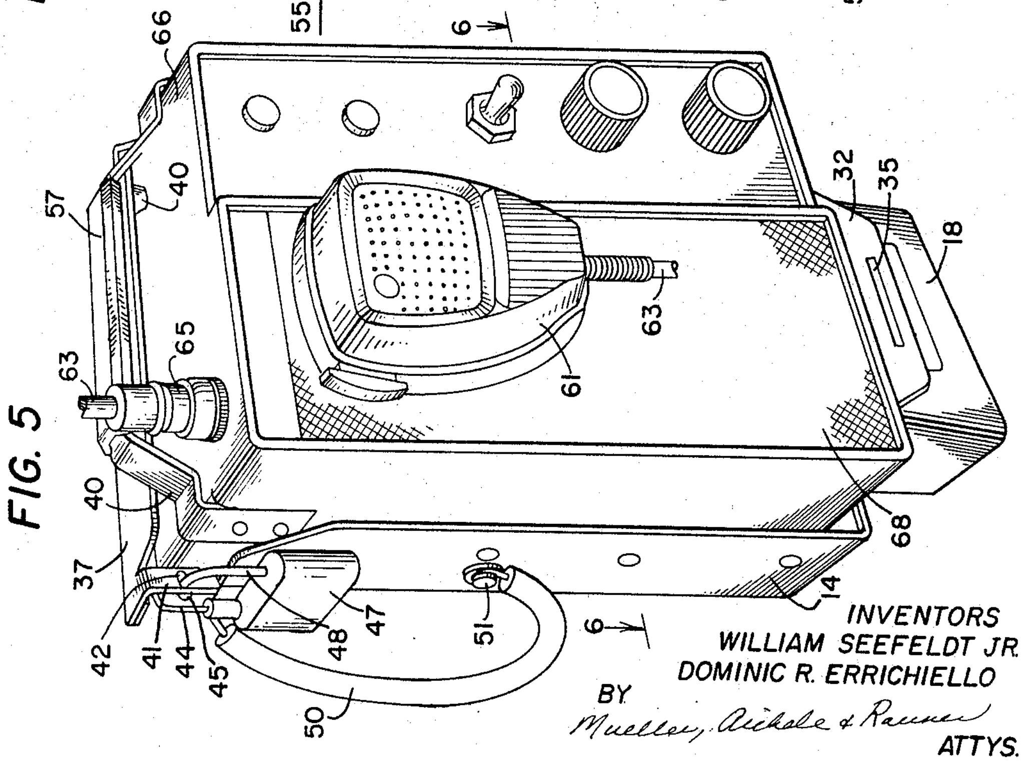
FIG. 5 is a drawing showing the mounting structure with an electronic device positioned therein.

FIG. 5 illustrates electronic device 55 positioned within mounting structure 10. FIG. 6 is a cross sectional view of the mounting structure of FIG. 5 and illustrates how guides 53 and 54 mate with guide slots 59 of the electronic device 55 to guide the device during insertion of the device in the mounting structure.

With electronic device 55 inserted within mounting structure 10, connector 64, shown in FIG. 4, mates with connector 20 shown in FIG. 1 establishing electrical connections to the electronic device. Electronic device 55 shown in FIG. 5 is a communications unit having a microphone 61 for communications between the location of the mounting structure and other desired locations. Microphone 61 is connected to the electronic device 55 through cable 63, shown broken, and conector 65. However, while the mounting structure is shown with a communications device mounted therein, it can be adapted for other forms of electronic equipment as desired.

As shown in FIG. 5, with electronic device 55 inserted in mounting structure 10, holding plate 37 is positioned so that pads 40 bear down against the top end wall of mounting structure 10 holding electronic device 55 in position within mounting structure 10. Opening 42 in arm 41 and opening 45 in arm 44 are in alignment so that shackle 48 of padlock 47 can be inserted through openings 42 and 45 to lock holding plate 37 in this position. Thus, padlock 47 can be used to lock electronic device 55 within mounting structure 10. FIG. 7 shows an enlarged view of the locking mechanism of holding plate 37. Electronic device 55 also includes a back wall 67 and a front wall 68 upon which are mounted controls for the electronic equipment.

Thus, a simple mounting structure for an electronic device has been shown. The electronic device can be quickly installed by inserting it in the mounting structure and it is easily removed from the mounting structure. An electrical connector in the mounting structure mates with a similar electrical connector in the electronic device to establish the proper electrical connections for the electronic device. A lock is provided to lock the electronic device in the mounting structure and the same lock is used to secure a cover plate over the electrical connector in the mounting structure.

We claim:

1. A mounting structure for an electronic device having a first surface with first electrical connector means mounted thereon and a second surface opposite said first surface, said mounting structure including in combination, support means, second electrical connector means positioned on said support means, cover plate means pivotally mounted on said support means and having a first position covering said second electrical connector means and a second position exposing said second electrical connector means, holding plate means pivotally mounted on said support means, said holding plate means having a first position to permit the electronic device to be placed within said support means and a second position in which said holding plate means bears against said second surface of the electronic device for holding the electronic device within said support means.

2. The mounting structure of claim 1 wherein said support means includes locking plate means pivotally mounted on said support means and adapted to engage said cover plate means to hold the same in its first position, said support means further including latching means for holding said cover plate means in said second position, and locking means adapted to lock said cover plate means in said first position and said holding plate means in said second position.

3. The mounting structure of claim 1 wherein said cover plate means includes a pad of resilient material, said pad being positioned within said cover plate means to cover and seal said second electrical connector means with said cover plate means in said first position.

4. The mounting structure of claim 2 wherein said support means includes a back plate adapted to be rigidly positioned at a desired location, a bottom plate extending from said back plate and having said second electrical connector means positioned thereon, a pair of side plates extending from said back plate, and a guide bar on each of said side plates positioning the electronic device within said mounting structure, said cover plate means and said latching means each being pivotally mounted on said back plate and said locking plate means being pivotally mounted on said bottom plate, and said holding plate means being pivotally mounted on said back plate.

5. The mounting structure of claim 4 wherein said cover plate means includes an elongated tongue portion having a first opening therein and extending from said cover plate means, said locking plate means having a second opening therein for receiving said tongue portion with said locking plate means holding said cover plate means in said first position, said holding plate means including a first arm having a third opening therein and extending from said holding plate means, one of said side plates having a second arm extending therefrom with a fourth opening therein, said third and fourth openings being in alignment with said holding plate means in said second position, a padlock having a shackle portion, said first opening being adapted to receive said shackle portion to maintain said cover plate in said first position and said third and fourth openings being adapted to receive said shackle portion to maintain said holding plate means in said second position.

6. An electronic unit for vehicular communications, including in combination, support means, first electrical connector means positioned on said support means, cover plate means pivotally mounted an said support means and having a first position covering said first electrical connector means and a second position exposing said first electrical connector means, an electronic device having second electrical connector means, said electronic device being positioned within said support means and having said first and second electrical connectors mechanically and electrically engaged, holding plate means pivotally mounted on said support means, said holding plate means having a first position to permit said electronic device to be placed within said support means and a second position in which said holding plate means bears against said electronic device to secure the same within said support means.

7. An electronic unit in accordance with claim 6 wherein said support means includes a back plate with a bottom plate and a pair of side plates extending therefrom, with said bottom plate having said first electrical connector means thereon and said side plate each having a guide bar thereon, said electronic device being of rectangular shape with front and back walls, top and bottom end walls and side walls having guide slots therein to receive said guide bars, and with said second electrical connector means at said bottom end thereof to engage said first connector means, said holding plate engaging said top end thereof, and said electronic device further having controls on said front wall in accessible positions.

8. The electronic unit according to claim 6 wherein, said holding plate includes an arm extending therefrom and having a first opening therein, said support means having a side plate including an arm extending therefrom with a second opening therein, said first and second openings being in alignment with said holding plate means in said second position, and locking means having a portion extending through said first and second openings with the same being in alignment to lock said electronic device within said support means.

9. An electronic device adapted to be mounted on a supporting frame having a back plate with a bottom plate and a pair of side plates extending therefrom and a holding plate pivoted to the top thereof with the bottom plate having connector means thereon and the side plates each having a guide bar thereon, said device being of rectangular configuration with front and back walls, top and bottom end walls, and side walls having slots therein to receive the guide bars on the side plates of the supporting frame, connector means at the bottom end of said device to engage the connector means on the bottom plate of the supporting frame, and controls on the front wall of said device in accessible positions.

References Cited

UNITED STATES PATENTS

| | | | |
|---|---|---|---|
| 1,970,660 | 8/1934 | La Fever | 248—203 X |
| 2,514,246 | 7/1950 | Knox | 317—101 |
| 2,609,268 | 9/1952 | Nye | 312—223 X |
| 3,071,728 | 1/1963 | Grace et al. | 325—312 |
| 3,244,981 | 4/1966 | Dertatevasian | 325—312 |

CASMIR A. NUNBERG, *Primary Examiner.*